Jan. 30, 1962 J. G. BROWN 3,018,894
FILTER FRAME AND FILTER PRESS
Filed Sept. 23, 1960 2 Sheets-Sheet 1

INVENTOR.
Judson G. Brown
BY Donald L. Brown
and William M. Anderson
ATTORNEYS

United States Patent Office 3,018,894
Patented Jan. 30, 1962

3,018,894
FILTER FRAME AND FILTER PRESS
Judson G. Brown, 18 Park Ave., Wakefield, Mass.
Filed Sept. 23, 1960, Ser. No. 58,042
7 Claims. (Cl. 210—231)

This invention relates to filtration apparatus and to filter frames adapted for use therein.

One object of the present invention is to provide filter frames of novel structure for use in reversible filtration processes.

Other objects of the invention are to provide filter frames of the character described which may be used interchangeably in the construction of novel filter presses; and to provide filter presses for use in connection with reversible filtration processes and which employ the novel filter frames of the present invention.

Other objects of the invention will in part be obvious and will in part appear hereinafter.

The invention accordingly comprises the apparatus possessing the construction, combination of elements and arrangement of parts exemplified in the following detailed disclosure of one preferred embodiment of the invention.

For a fuller understanding of the nature and objects of the invention, reference should be had to the following detailed description taken in connection with the accompanying drawings wherein.

Figures 1, 2:
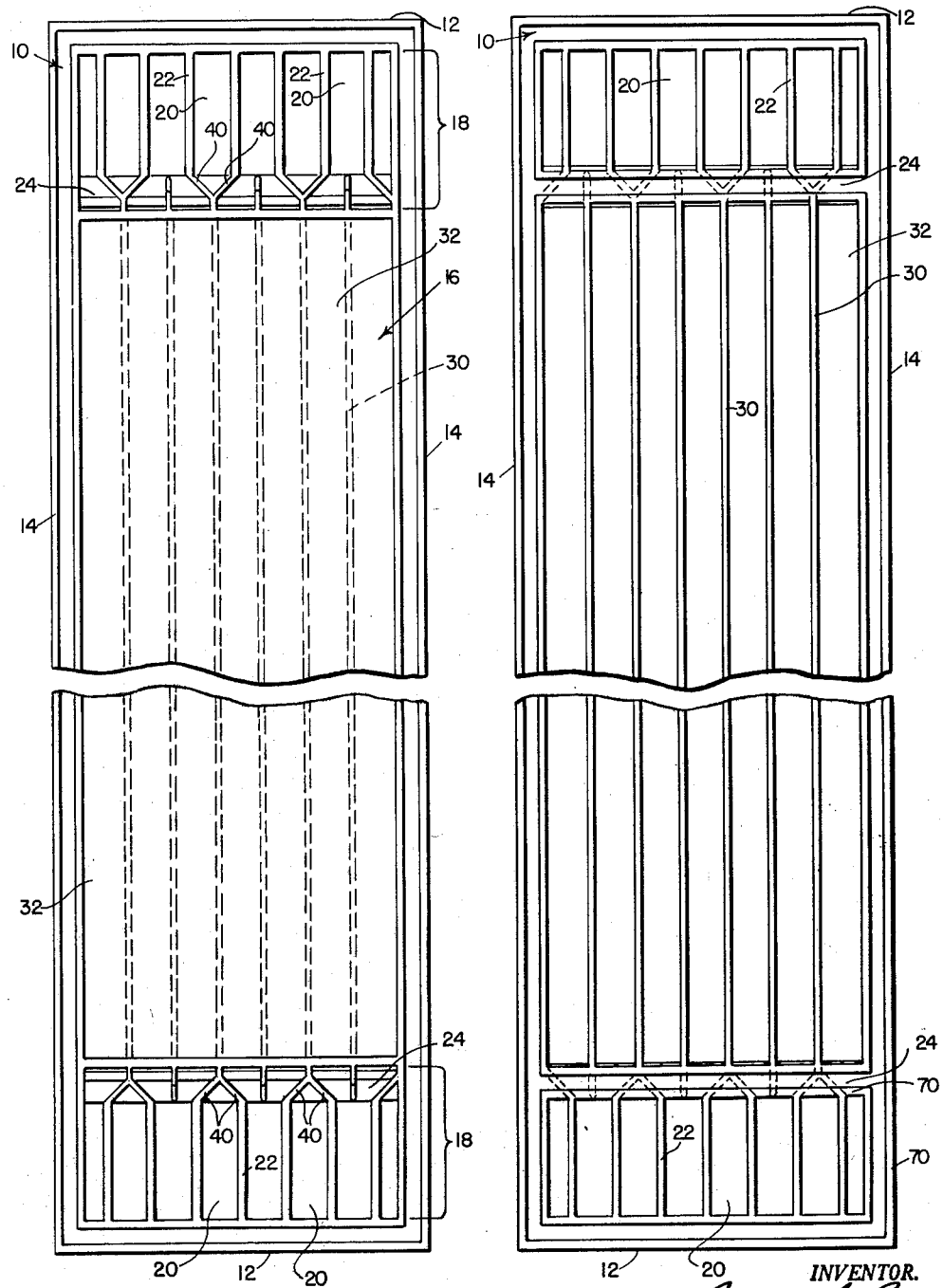
FIGURE 1 is a view in front elevation of a filter frame illustrative of a preferred embodiment of the invention.
FIG. 2 is a view in rear elevation of the frame shown in FIG. 1.
Figure 3:
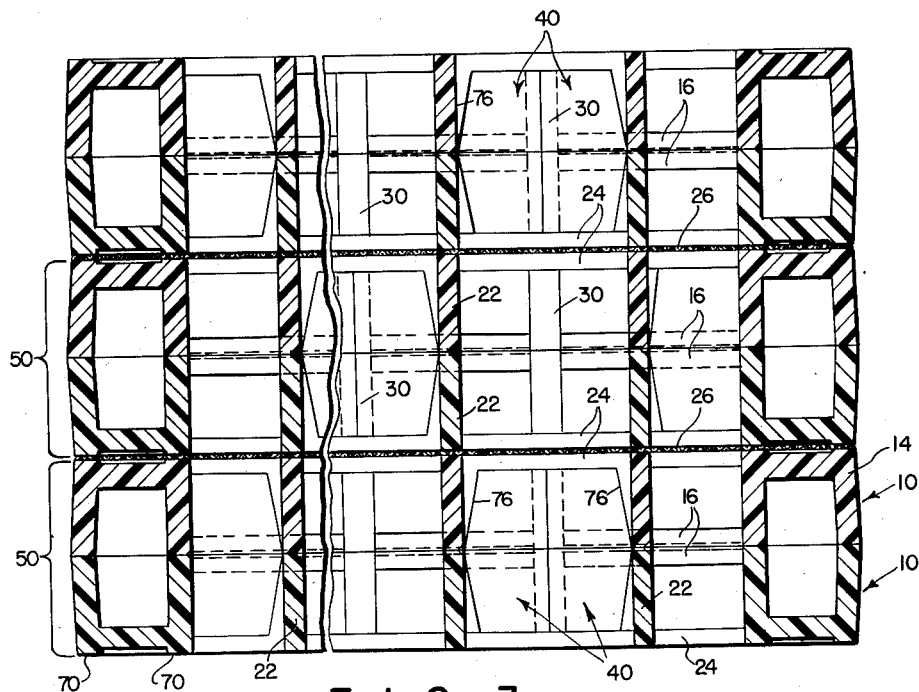
Figure 4:
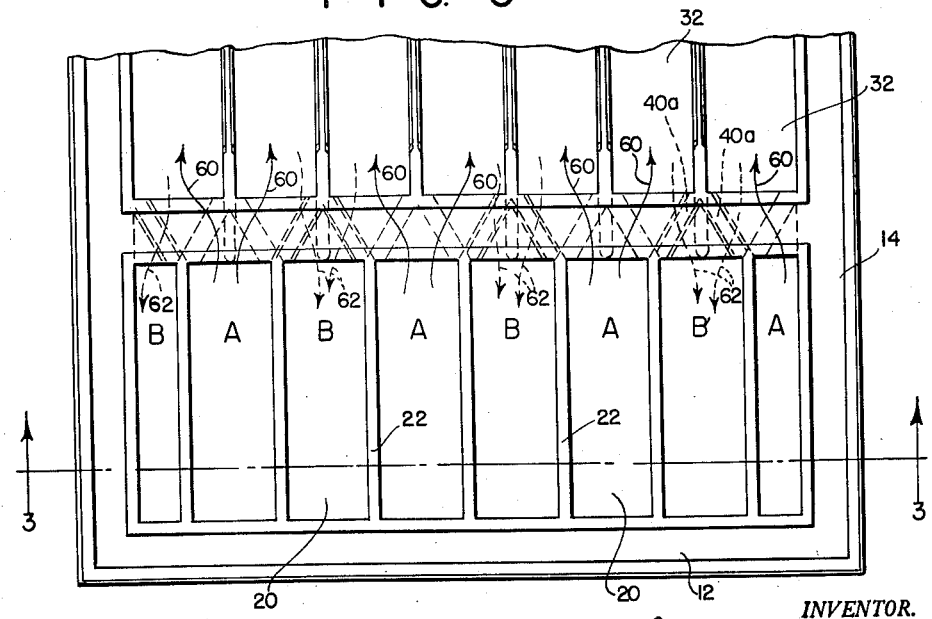

FIG. 3 is an enlarged partial sectional view, taken along the line 3—3 of FIG. 4, of a filter press comprising a plurality of frame elements such as are illustrated in FIGS. 1 and 2, assembled with suitable filtering media in a manner adapted to be employed in a reversible filtration process as hereinafter described; and FIG. 4 is a front view in elevation on a somewhat reduced scale of the partial filter press shown sectionally in FIG. 3.

The copending application of Judson G. Brown, filed July 27, 1954, Serial No. 446,069, discloses and claims a reversible filtration process and apparatus for use therein wherein the material to be filtered is caused to pass through a suitable filtering medium or membrane so as to deposit solids on a first surface thereof until a cake is formed of a thickness so as to make further filtration inefficient. The direction of flow of slurry through the filtering medium is then reversed, the deposited cake is washed from the first surface of the filtering medium and additional cake built up on the second surface. The cake washed from the filtering medium falls to the bottom of the filter and is removed during the initial stages of the cycle of the reversed slurry flow, and thereafter clarified effluent is withdrawn. This process may be repeated through successive cycles without shutting down the flow of incoming slurry.

The present invention provides filter frames of novel structure and novel filter presses utilizing these filter frames and especially adapted for use in such reversal filtration processes. The filter frames of this invention are so designed as to be interchangeable when assembled to provide filter presses of the character hereinafter described, and are useful not only to provide conduits and ports through which slurry may be fed to suitable filter media, but also to provide conduits and ports for the removal of clarified filtrate.

The filter frames of the present invention provide slurry feeding conduits and filtrate removal conduits in the form of multiple channels positioned preferably adjacent each end of the filter frame. Half of these channels function initially as conduits for slurry which is fed to the filter press and the remaining channels function initially as conduits for the removal of clarified effluent from the filter. Upon reversal of the slurry flow, the channels which initially function as conduits for the removal of clarified effluent are employed to convey slurry to the filtering media, and those channels which initially function to convey slurry to the filter are employed to carry from the filter clarified effluent.

With reference to FIGS. 1 and 2, there is shown a single filter frame 10 illustrative of a preferred embodiment of the invention. The frame comprises end walls 12 and side walls 14. Between the side walls 14 and substantially flush with one face of the filter frame, for example the front face as shown in FIG. 1, there is provided a thin plate 16 which terminates short of the end walls 12. This plate extends from one to the other of the side walls of the frame and serves as a barrier to the flow of slurry or filtrate depthwise of the filter frame. It provides with the side walls 14 a shallow, open-ended tray for the reception of slurry or filtrate in a manner hereinafter described. Its principal function is, however, to provide mechanical strength to the frame unit, and, where composite filter elements of the type hereinafter described are employed, it may be reduced in size, or even omitted.

The openings provided between the ends of the platelike element 16 and the end walls 12 of filter frame 10, and illustrated in FIG. 1 by the brackets 18, provide passageways depthwise of the filter frame which are subdivided, as hereinafter described, to provide a multiplicity of conduits for the feeding of slurry and withdrawal of clarified effluent. These open areas 18 are symmetrically partitioned into a plurality of liquid-transmitting conduits or channels 20 by partitions 22 which are substantially the same depth as are the walls 12 and 14.

In the embodiment of the invention shown in the drawings, eight channels 20 are provided adjacent each end of the filter frame. Two of these channels, those adjacent the side walls 14, are half the width of the six other channels. In the operation of the filter press utilizing a plurality of filter frames 10, the frames are arranged and stacked in a manner hereinafter described so that the channels 20 of one frame are in registry with the channels 20 of adjacent frames, thus providing a plurality of conduits, in the case of the frames shown in FIGS. 1 and 2 eight conduits, adjacent the top and bottom of the filter press. Alternate ones of these conduits are employed to carry slurry and the remaining conduits are employed to carry clarified effluent or filtrate.

In the device shown in the drawings three full-sized conduits and one half-sized conduit are employed for each purpose.

Extending across the filter frame from one side wall 14 to the other side wall 14 and substantially flush with the open face of the frame, i.e. with the face opposed to that with which the plate 16 is flush, are two thin, narrow barrier strips or bridges 24 each of which is positioned so as to substantially overlie ends of the partitions 22. These strips 24 with the adjacent side walls 14 provide a frame for the reception of a sheetlike filtering medium 26 (FIG. 3) which may comprise any suitable thin, fine mesh, sheetlike element, such as a filter cloth made of canvas nylon, polyvinylidine chloride or other suitable material. The filter medium 26 is preferably of such size and shape as to cover completely the open area defined by the side walls 14 and the barrier strips 24, thus providing with the side walls 14 and the platelike element 16 a shallow filtering chamber extending substantially the full width of the filter frame and open at each end to the plurality of liquid-transporting conduits or channels 20.

This shallow filtering chamber is divided into a plurality of channels of equal width by the ribs or partitions 30 which extend from the inner face of the plate 16 to the plane defined by the outer faces of the barriers 24 and the side walls 14. The ribs or partitions 30 thus make contact with the filter medium 26. The channels 32 provided by the partitions 30 are substantially of the same width as are the full-sized conduits 20. The partitions 30 are so positioned with respect to the partitions 22 that each channel or conduit 20 feeds into two of the channels 32, except for the half-width conduits 20 each of which feeds into only one of the channels 32. This is accomplished as shown in the drawings by positioning the ribs 30 along the median lines of the conduits 20 and by positioning the ribs 22 along the median lines of the channels 32. In the embodiment of the invention shown in the drawings, this results in the provision of seven full-sized channels 32 and of six full-sized and two half-sized conduits 20.

Baffles 40 are provided extending depthwise the full depth of the filter frame and joining the ends of alternate partitions 30 to two partitions 22. The result is to provide a structure in which half of the conduits or channels 20 are blocked from any communication with the channels 32. These blocked or closed conduits, each of which is defined by an end wall 12, two partitions 22 and two baffle elements 40, serve merely to transport liquid depthwise of the filter frame. It should be noted that one of these closed conduits at each end of the frame is a half-width conduit. Each of the remaining conduits 20, including at each end of the frame three full-width conduits and one half-width conduit, is open to one or more of the channels 32. Thus, liquid introduced into these open-ended conduits will flow freely into channels 32 and from these channels it may be forced through the filtering medium 26.

In a preferred embodiment of the invention a composite filter frame is formed, as is shown for example at 50 in FIG. 3, by positioning two elements 10 back-to-back and sealing, bonding or clamping them in this position so that the two thin, platelike elements 16 are in substantial contact, the baffle members 40 of one element 10 are in alignment and superposed with those of the other element 10, and each face of the composite unit is open and adapted to receive a filtering medium or cloth. When the filter frames 10 are so positioned and bonded together, the closed end conduits 20 are in registry with one another and the open-ended conduits 20 are also in registry with one another.

A filter press adapted for reversal filtration may be constructed by arranging composite, double-frame units such as have been described in adjacent superposed relation, as shown for example in FIGS. 3 and 4. Each unit is separated from the adjacent units by a filter medium 26 and adjacent composite frame units are so positioned in the filter press that the closed conduits 20 of one composite unit are in registry with the open conduits 20 of the adjacent composite units. This may be accomplished if the closed half-sized conduits 20, for example the half-sized conduits shown as adjacent the right-hand side wall 14 of FIG. 1, are positioned to overlie the open-ended half-sized conduits of adjacent composite frame assemblies 50. This structure may perhaps be better understood if it be assumed that adjacent composite frame assemblies are arranged and positioned so that alternate assemblies have their baffles 40 as shown, for example, in FIG. 1 and FIG. 2. It will be noted that the left-hand half-sized conduit 20 adjacent the upper edge of the frame shown in FIG. 1 is open-ended, whereas the corresponding conduit in FIG. 2 is closed by a baffle 40, and that the first full conduit 20 from the left adjacent the upper end of the frame shown in FIG. 1 is closed by two baffle members 40 while the corresponding conduit in FIG. 2 is open-ended and feeds into two channels 32.

With the filter press assembled in the manner described, slurry to be clarified may be introduced in any suitable manner into alternate conduits 20; it will flow from these conduits into channels 32 wherever the conduits are open-ended; it will then flow through filter media 26 into channels 32 in adjacent filter frame units. These channels will communicate with the conduits that were closed with respect to the channels into which the slurry was introduced and the clarified effluent may be withdrawn through this second plurality of conduits 20. When cake has built up upon the faces of the filtering media which initially receive the slurry to be filtered, the direction of flow may be reversed, the slurry may now be introduced into those conduits which have previously been employed to convey clarified effluent, and the effluent or filtrate may now be withdrawn through the conduits previously employed to carry the slurry. The reversal of flow will wash the cake from the filter media.

Means for feeding slurry to the filter press and for withdrawing clarified effluent and for suitably closing exposed channels at the ends of the filter press are not shown as it is believed that the provision of such means is well within the knowledge and skill of the art. Any suitable liquid-carrying pipes or conduits with any suitable valve means may be employed and the slurry may be pumped or forced or drawn into the filtering unit or filter press with the provision of a suitable pressure differential across the filtering media. It will be apparent that the size of the filter frame is not critical nor is the number of conduits employed to carry slurry and filtrate. Moreover, while a preferred form of the invention contemplates the use of composite back-to-back filter frames constructed as shown and described in connection with FIGS. 3 and 4, it will be apparent that individual frame elements may be employed. Two such elements, in face-to-face relation so that the closed conduits of one are in registry with the open conduits of the other, will provide a filter wherein slurry may be introduced in alternate conduits and clarified effluent withdrawn through the other conduits.

The operation of the filter press of the present invention may perhaps be more easily understood by reference to FIG. 4 where there is shown diagrammatically a flow pattern of liquid through one end of the filter press. Let it be assumed that slurry to be filtered is introduced into the conduits A. This slurry will then pass into the channels 32 which are in communication with the conduits A as shown by the arrows 60. The conduits B are understood to be blocked by the baffles 40a, which are shown in double dotted lines, from communication with the channels 32 into which the slurry is fed. The material to be filtered then passes through the filtering medium into channels 32 which are in registry with and overlie those channels into which the slurry was initially introduced. The filtrate is now, however, within the shallow filtering chamber of an adjacent composite frame element and these channels are open to the conduits B and blocked from conduits A. The flow of clarified effluent is illustrated by the dotted arrows 62.

In order to insure effective sealing between adjacent composite frame elements 50, the walls 12 and 14 of the frame and the edges of the barrier strips 24 may be provided with shallow ribs 70, thus facilitating sealing between adjacent frame elements when the filter press is assembled. If advisable, sealing gaskets may be employed between adjacent members of the assembly, in which case it is to be understood that the dimensions of the walls and other elements comprising the frame and the partitions within the frame walls may be modified slightly to receive the sealing gasket and still to provide the necessary contact between partitions and rib elements and the filtering media.

The filter frames and filter presses of this invention are also useful as heat exchange apparatus. In such an apparatus the frames may be arranged with respect to each other as in a filter press such as that heretofore described, and the filter media may be replaced with heat exchange media such, for example, as metal foils. In such a structure means may be provided to circulate the material to be heated through the channels and conduits normally employed initially to carry either slurry or effluent and the heating material through the other set of channels and conduits.

The filter presses of this invention may similarly be employed to carry out chemical reactions. For example, a catalyst may be deposited on the filter media and the reactants fed through the conduits and channels normally employed to carry either effluent or slurry. The products produced may be removed through the other set of conduits and channels.

It will be understood that the filter frames of the present invention may be constructed of various materials. In a preferred embodiment they may be of plastic material and especially of a resilient plastic, such for example as a copolymer of styrene and butadiene. Such resilient plastics are particularly adapted for the provision of good seals between adjacent filter panels without the use of gaskets. Where the filter panel is molded it may be desirable to taper certain of the elements, for example the baffles 40 as shown, for example, at 76 in FIG. 3, to facilitate removal from the mold. Slurry to be filtered should preferably be fed to the press under pressure and it is to be understood that any suitable means may be provided for supplying adequate pressure differential. For example, a pump may be employed to force the slurry through the press.

Since certain changes may be made in the above apparatus without departing from the scope of the invention, it is intended that all matter contained in the above description or shown in the accompanying drawings shall be deemed illustrative and should not be construed as limiting the invention.

What is claimed is:

1. A filter frame comprising end walls and side walls of substantial depth; a thin reinforcing plate positioned adjacent one face of said frame and extending from one to the other of said side walls, said plate being shorter than the length of said side walls and being so positioned as to provide an open area depthwise of said frame between each end of said plate and the adjacent end wall of said frame; a first plurality of substantially parallel, depthwise partitions positioned in each said open area and extending from an end wall of said frame to provide a plurality of depthwise conduits at each end of said frame; a second plurality of partitions, affixed to the inner surface of said plate, and positioned lengthwise of said frame and substantially parallel to said first plurality of partitions to provide a plurality of side-by-side channels of substantially equal width, said first-mentioned plurality of partitions being positioned substantially along the median lines of said channels; and baffle means connecting each end of alternate ones of said second plurality of partitions to the ends of two adjacent ones of said first plurality of partitions.

2. A filter frame as defined in claim 1 in which the conduits adjacent the side walls of the frame are each approximately one-half the width of each remaining conduit.

3. A filter frame as defined in claim 1 in which narrow sealing strips are provided extending between the side walls of the frame and overlying and affixed to said baffle means, said sealing strips and the portions of the side walls of the frame lying therebetween providing a frame for the reception of a thin sheetlike filter medium.

4. A filter frame consisting of two frame units each comprising end walls and side walls of substantial depth; a thin reinforcing plate extending from one to the other of said side walls and positioned adjacent one edge thereof, said plate being shorter than the length of said side walls and providing an open area between each end of said plate and the adjacent end wall; a first plurality of substantially parallel, depthwise partitions positioned in each said open area and extending from an end wall to provide a plurality of depthwise conduits at each end of said frame; a second plurality of partitions affixed to the inner surface of said plate and extending substantially parallel to said first plurality of partitions and providing a plurality of side-by-side channels of substantially equal width, said first-mentioned plurality of partitions being positioned substantially along the median lines of said channels; and baffle means connecting each end of alternate ones of said second plurality of partitions to the ends of two adjacent ones of said first plurality of partitions; said frame units being positioned together in back-to-back relation with the plates thereof substantially in contact and with the partitions and baffle means thereof in substantial registry.

5. A filter press comprising a multiplicity of substantially identical composite filter frame elements, each such element consisting of two frame units, each unit comprising end walls and side walls of substantial depth; a thin reinforcing plate positioned adjacent one face of each said frame unit and extending from one to the other of said side walls, said plate being shorter than the length of said side walls and being so positioned as to provide an open area depthwise of said frame unit between each end of said plate and the adjacent end wall of said frame unit; a first plurality of substantially parallel, depthwise partitions positioned in each said open area and extending from an end wall of said frame unit to provide a plurality of depthwise conduits at each end of said frame unit; a second plurality of partitions, affixed to the inner surface of said plate, and positioned lengthwise of said frame unit and substantially parallel to said first plurality of partitions to provide, with said plate, a plurality of side-by-side channels of substantially equal width, said first-mentioned plurality of partitions being positioned substantially along the median lines of said channels; and baffle means connecting each end of alternate ones of said second plurality of partitions to the ends of two adjacent ones of said first plurality of partitions; said units being mounted in back-to-back relation with the plates thereof in engagement and with the partitions and baffle means thereof in substantial registry; said press comprising thin sheetlike filter media positioned between adjacent composite frame elements.

6. A filter press as defined in claim 5 wherein said composite elements are so positioned that the baffle means of adjacent composite elements are out of registry and the baffle means of alternate composite elements are in registry.

7. A filter press as defined in claim 5 wherein said composite elements are so arranged with filter media positioned therebetween as to provide a multiplicity of conduits and channels for the reception of slurry to be filtered, the channels of said multiplicity being in registry with a second multiplicity of channels adapted, in connection with conduits communicating therewith, for the withdrawal of clarified effluent.

References Cited in the file of this patent

UNITED STATES PATENTS

| | | |
|---|---|---|
| 92,465 | Needham et al. | July 13, 1869 |
| 393,633 | Enzinger | Nov. 27, 1888 |
| 765,277 | Gerbach | July 19, 1904 |
| 1,955,158 | Wells | Apr. 17, 1934 |
| 2,390,628 | Van Winkle | Dec. 11, 1945 |